United States Patent [19]
Fortson

[11] Patent Number: 5,095,772
[45] Date of Patent: Mar. 17, 1992

[54] BICYCLE PEDAL EXTENSION

[76] Inventor: Tom Fortson, P.O. Box 866994, Plano, Tex. 75086-6994

[21] Appl. No.: 534,970

[22] Filed: Jun. 7, 1990

[51] Int. Cl.⁵ ............................................. G05G 1/14
[52] U.S. Cl. ................................ 74/594.3; 74/594.1; 74/594.2
[58] Field of Search ............... 74/417, 423, 594.3, 74/665 M, 594.1, 594.2; 280/260; D12/111

[56] References Cited

U.S. PATENT DOCUMENTS

| | | | |
|---|---|---|---|
| 4,446,754 | 5/1984 | Chattin | 74/594.3 |
| 4,519,271 | 5/1985 | Chattin | 74/594.3 |
| 4,706,516 | 11/1987 | Xi | 74/594.1 |
| 4,793,208 | 12/1988 | Bregnard et al. | 74/594.2 |
| 4,807,491 | 2/1989 | Stuckenbrok | 74/594.1 |
| 4,872,695 | 10/1989 | Silvano et al. | 74/594.3 |
| 4,881,732 | 11/1989 | Kepiro | 74/594.3 X |
| 4,882,945 | 11/1989 | Trevizo | 74/594.3 |
| 4,960,013 | 10/1990 | Sander | 74/594.3 |

FOREIGN PATENT DOCUMENTS

| | | | |
|---|---|---|---|
| 937354 | 8/1948 | France | 74/594.3 |
| 2487282 | 1/1982 | France | 74/594.3 |

Primary Examiner—Vinh T. Luong
Attorney, Agent, or Firm—John W. Montgomery

[57] ABSTRACT

A pedal apparatus operatively connectable for powering a bicycle or the like vehicle comprising an axle rigidly affixed to the vehicle frame and independently rotatable left and right pedal hubs with attached pedals rotatably mounted on the axle such that the pedal apparatus when taken together with a synchronizer for synchronizing the rotation of the left and right pedal hubs attached to the bicycle frame, and extender for the pedals operatively interconnected with each of the pedal hubs extends the distance between the rigidly affixed axle and the pedals during a portion of each respective pedal stroke and contracts the distance on another portion of each pedal stroke.

2 Claims, 2 Drawing Sheets

BICYCLE PEDAL EXTENSION

BACKGROUND OF THE INVENTION

The present invention relates to bicycle pedal arm extensions and in particular to an apparatus which automatically extends the pedal arm during the downstroke and retracts each pedal arm for the upstroke while bicycling.

In riding bicycles the rider's legs push rotating pedals in a generally circular motion. The pushing is transformed into rotational torque which is transmitted to one of the wheels which in turn through frictional contact with the ground provides linear propulsion to the bicycle. Typically two pedals are positioned at 180° with respect to each other on a solid rotating shaft which is supported with bearings through a portion of the lower frame of the bicycle so that pushing down on one of the pedals provides a corresponding lifting or raising of the other pedal. While competition cyclist both push and (with toe straps) pull the pedals as they ride, it has been found that the downward stroke is the most efficient and most forceful stroke for the typical bicycle rider. Even with experienced competition bicycle riders there is only a small force applied as the pedal is traversing upward from the bottom position back to the top position.

Since torque is a product of the force and length of the moment arm, it has been found that increasing the length of the bicycle pedal arms during the downward thrust can generate more torque with less force. Also, if the pedal arm is shortened during the upward stroke it will return more rapidly to the upward position and will again be ready for the powerful downward stroke.

Prior devices which have attempted to increase the length of the pedal arm during the downstroke have been complex, cumbersome, and subject to inefficiencies resulting from substantial amounts of sliding or rolling friction between offset cams and cam followers attached at both sides of the bicycle for interaction with extendible pedal arms.

In 1984, Chattin in U.S. Pat. No. 446,754 disclosed a telescoping pedal which is activated using a roller bearing in an offset cam plate. This concept was similarly disclosed in U.S. Pat. No. 4,519,271 also issued to Chattin in 1985.

In 1987, Xi in U.S. Pat. No. 4,706,566 disclosed another offset cam plate arrangement for providing varied pedal arm length.

In U.S. Pat. No. 4,807,491 issued Feb. 28, 1989, Stuckenbrok details various aspects and improvements to extension pedal arms. These arms are to be activated using an offset circular pattern using an offset cam plate similar to those of the preceding patents.

Another approach to pedal arm extension is shown in U.S. Pat. No. 4,882,945 issued to Trevizo Nov. 28, 1989 which discloses an apparatus which uses the relative rotation between the pedal held horizontal by the rider's foot and the pedal arm which rotates to provide a small amount of periodic extension and contraction of the pedal length.

Other substantially more complicated apparatus for changing the length of bicycle pedal arms have been variously described in U.S. Pat. No. 4,793,208 by J. P. Bregnard et al, and in U.S. Pat. No. 4,872,695 by T. Silvano et al.

None of the foregoing disclosures provide a completely adequate and efficient offset pedal extension apparatus.

SUMMARY OF THE INVENTION

Applicant's invention overcomes many of the drawbacks of the double sliding cam arrangements in which the offset sliding cams are positioned on each side of the bicycle frame. The invention avoids the complexities of the crank arms of Silvano and the gear case of Bregnard. Applicant's invention uses a fixed axle with independent left and right pedal hubs, which pedal hubs are synchronized through a simple bevel/spur gear idler system. Each hub has affixed thereto an extendable pedal arm which is actuated for increased pedal length during the downstroke and decreased pedal length during the upstroke relative to the fixed nonrotating axle about which the hub rotates. An offset pivoted crank rod activates the pedal extension arm and eliminates the sliding friction characteristic of the cam and cam follower arrangement of the prior devices.

BRIEF DESCRIPTION OF THE DRAWINGS

These and other objects and advantages will become apparent with reference to the following detailed description of the invention and with reference to the following drawings in which like numerals represent like elements and in which.

DETAILED DESCRIPTION OF THE INVENTION

Figure 1:
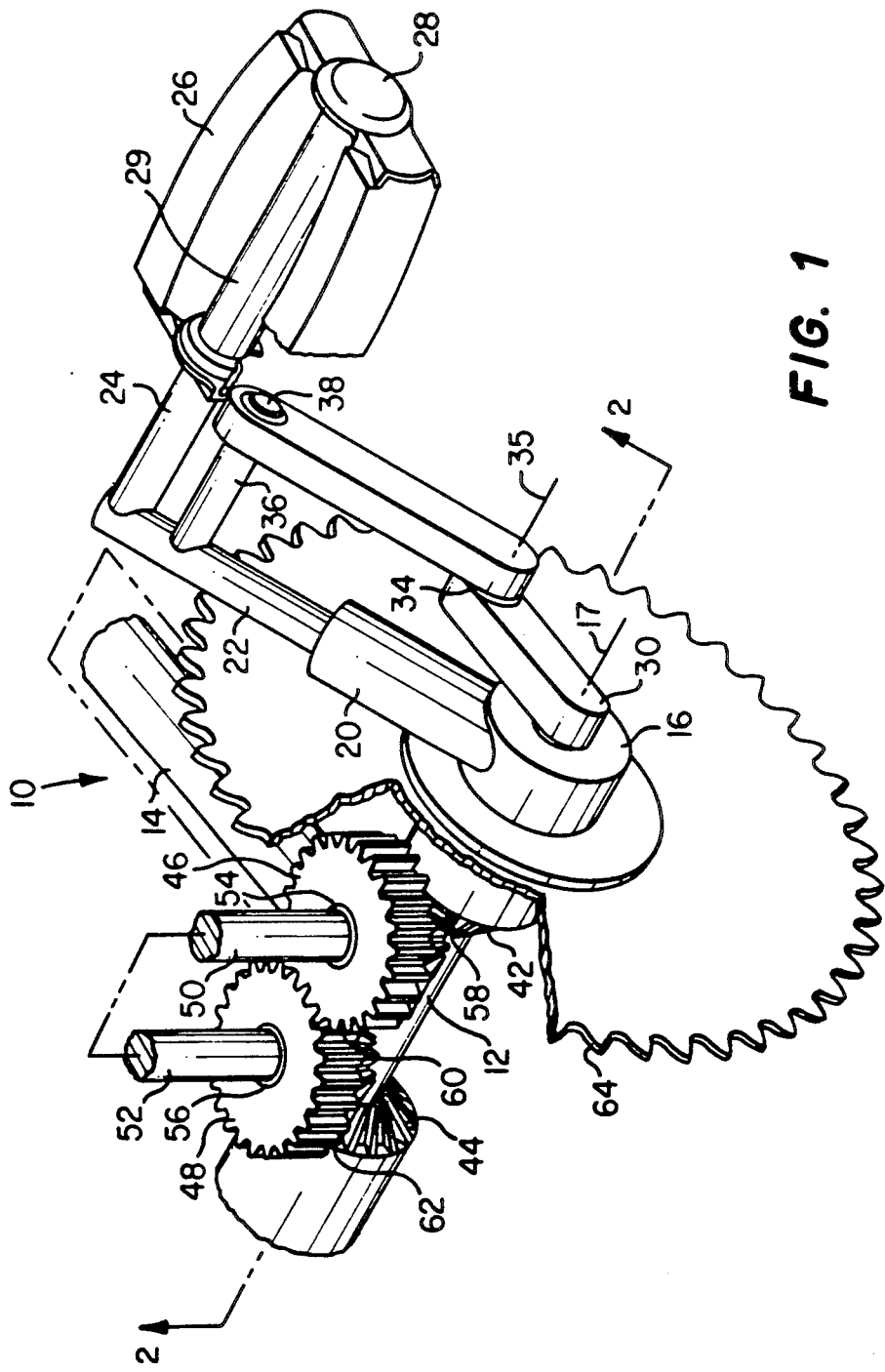
FIG. 1 is a prospective view of one side of the pedal extension apparatus and synchronizing mechanism of the present invention.

With reference to FIG. 1 which is a partially cut away prospective view of the inventive pedal extension apparatus 10 of the present invention. It will be seen that there is a fixed axle 12 which is rigidly affixed to lower bicycle frame 14. For clarity the entire bicycle is not depicted it being understood that while the fixed axle 12 could project to either side of bicycle frame 14 from any point it is generally advantageous to project the rigid axle 12 at right angles to the junction of the bicycle down tube and the seat tube. This intersection is normally centrally located at the lowest point in the frame between the front and rear bicycle wheels. Rotatably attached to the fixed axle are right rotating hub 16 and left rotating hub 18. Left rotating hub 18 is generally the mirror image of right rotating hub 16 except that both need not have chain driving sprockets. Thus, the invention will be described with reference primarily to right rotating hub 16.

Rigidly attached at right angles to right rotating hub 16 is an extension cylinder 20 into which extending pedal arm 22 is slideably inserted. A pedal spindle 24 is rigidly attached at the distal end of extending arm 22 at right angles outward from the bicycle. Pedal 26 is rotatably attached, as by pedal bearings 28 and 29 to spindle 24. A rigid arm 30 is affixed to the right most end of axle 12 exterior to right hub 16. Rigid arm 30 is affixed at right angles to fixed axle 12 and preferably projects toward the front of the bicycle generally parallel to the ground as defined by an imaginary line between the points of contact of the bicycle wheels and the ground.

There is a crank rod 32 which is pivotably or rotatably connected at one end thereof to the rigid arm through a pivot bearing connection 34. Crank rod 32 rotates about pivot bearing connection 34 centered on an axis of rotation 35 which is parallel but offset from the axis of rotation 17 for rotating hubs 16 and 18. There is a extender bar 36 affixed to the extending pedal arm 22 and projecting generally parallel to the pedal spindle 24 and adjacent thereto. Crank rod 32 is rotatably fastened to the extender bar 36 through a distal bearing connection 38.

With the foregoing construction it will be understood that as pedal 26 is pushed downward it acts through spindle 24, extending arm 22 and extension cylinder 20 to rotate hub 16. As extending pedal arm 22 and extension cylinder 20 reach a generally horizontal position which is parallel to rigid arm 30, crank rod 32 is in alignment with rigid arm 30. To accomodate the combined length of rigid arm 30 and crank rod 32 extending arm 22 is pushed outward to its maximum extension by sliding in extension cylinder 20. As the pedal rotates further downward and then into a rearwardly horizontal position, 180° from the forward horizontal position, the pedal distance from the axis of fixed axle 12 is a minimum corresponding to the crank rod length minus the forward offset distance of pivot bearing 34. This slides extending arm 22 back into extention cylinder 20. Between the maximum and minimum front and back extension positions the triangulated distance between fix axle 12 and pedal spindle 24 varies continuously from the maximum forward position to minimum rearward position and then from minimum rearward position to the maximum forward position. This action uniquely maximizes the moment arm between the pedal spindle 24 and the rotating hub 16 at the most forceful part of the downward stroke. This is maximum force normally occurs at the point at which the bicyclist will be pushing straight down. This forward position corresponds to the maximum strength of the cyclist and includes the entire weight of the cyclist. This takes fullest advantage of the torque generatable by the bicycle rider. It will be understood that the forward orientation of rigid arm 30 can be adjusted before affixing the rigid arm 30 slightly upwardly or slightly downwardly depending on the positioning of the bicycle seat and/or the bicyclist's riding style so that the maximum extension occurs at the precise position corresponding to the cyclist produced maximum force. This variation could, under extreme conditions, be as much as a 45° deviation from horizontal. Thus, the most efficient use of the cyclist energy through the extended length moment arm results. The moment arm of the up stroke is reduced without any substantial decrease in useable force because the pulling capabilities of the rider are generally much weaker.

Figure 2:
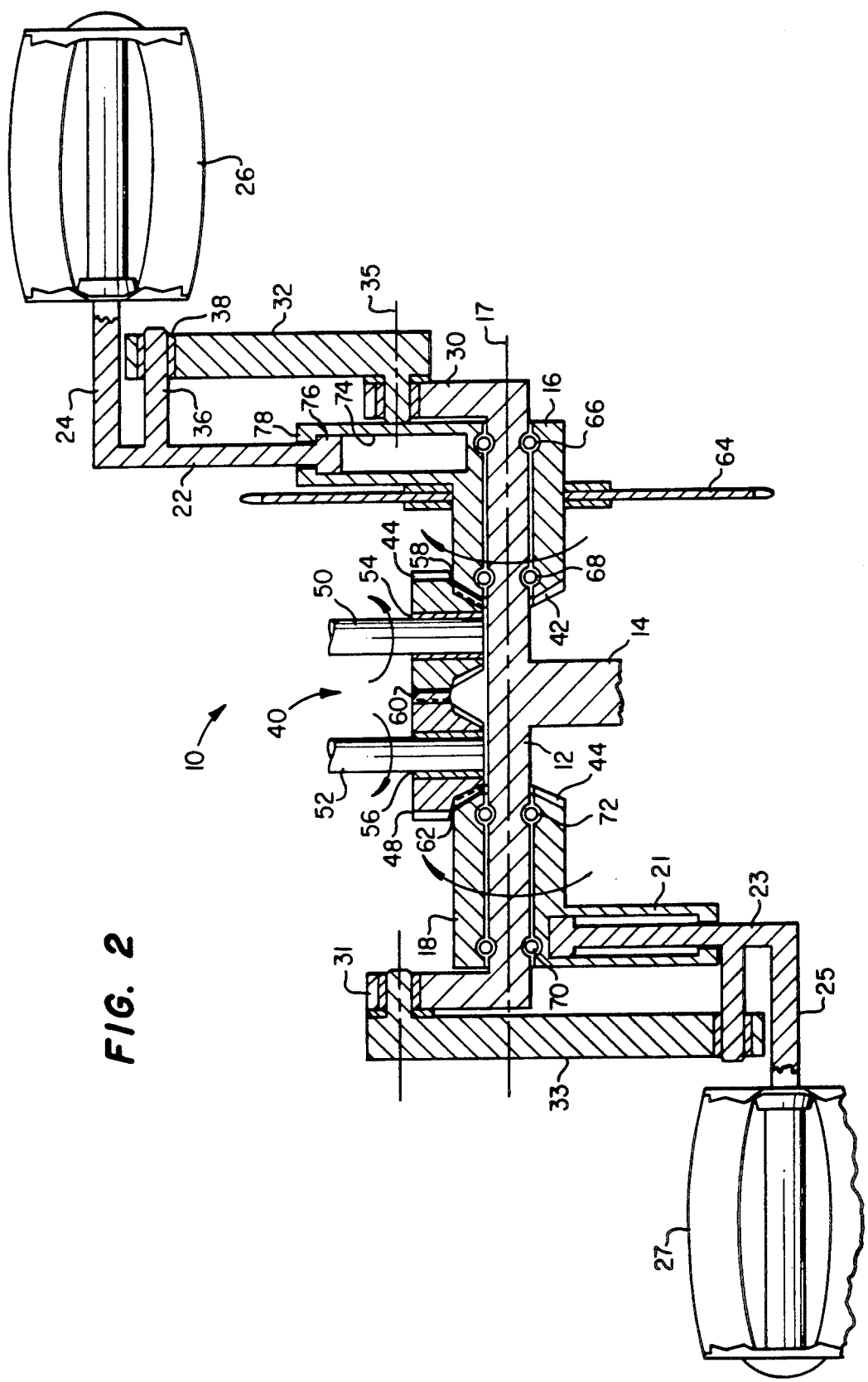
FIG. 2 is a schematic cross-sectional view of the pedal extension device according to the present invention taken along section line 2—2 through a central axis as shown in FIG. 1

It will be noted with reference to FIG. 2, which is a cross-sectional view through a central axis of a bicycle pedal extension mechanism according to the present invention, that attached to the left side of fixed axle 12 (not shown in FIG. 1 but rather shown in FIG. 2) there is also a left rigid extension arm 31 which also projects in the same generally forward direction of right rigid extension arm 30. However, as noted previously, in order to accomplish a downstroke with each foot of the rider, the pedals and the rotating hubs 16 and 18 are synchronized so that right pedal 26 is rotationally spaced 180° from left pedal 27. Thus, to maintain this synchronization a synchronizing gear set 40 comprises a right bevel gear 42 affixed to the inboard end of right rotating hub 16. There is also a left bevel gear 44 similarly attached at the inboard end of rotating hub 18. The right and left bevel gears can be pressed on to an end journal formed in hubs 16 and 18, they may be integrally formed with the hubs 16 and 18 and appropriately heat treated, or they may be affixed as through welding or other known mechanical attachment means.

A right bevel/spur gear 46 and a left bevel/spur gear 48 are connected to rotate about right fixed idler shaft 50 and left fixed idler shaft 5 respectively. Idler shafts 50 and 52 ar rigidly affixed to the bicycle frame 14 (attachment not shown) and are parallel and spaced apart from one another to support the right and left bevel/spur gears 46 and 48. Right idler bearing 54 and left idler bearing 56 such as frictionless roller or ball bearings can be used so that right bevel gear 42 rotates in mesh at 58 with right bevel/spur gear 46 and left bevel gear 44 rotates in mesh at 62 with left bevel/spur gear 48 so that the spur gear portion of each of the bevel/spur gears 46 and 48 operate in spur gear mesh at 60 with one another. Thus, if right rotating hub 16 is rotated in a clockwise rotary motion bevel/spur gear 46 will appear from the top to be rotating in a counter clockwise direction. Through spur gear mesh at 60, left bevel/spur gear 48 will then be rotated in an apparent clockwise direction when viewed from the top. This will in turn rotate hub 18 in a clockwise direction when viewed from the right. The right and left pedals are inventively maintained in proper orientation with respect to each other while permitting the use of a fixed axle 12 having rigid arms 30 and 31 extending forwardly therefrom.

Affixed for rotation with hub 16 is a sprocket or chain drive gear 64. While typically a single chain drive is required for a bicycle and while the single chain drive is typically on the right hand side of the bicycle, sprocket 64 could be attached to hub 18 provided that a corresponding rear chain drive sprocket is mounted to the left hand side of the wheel. Chain drives could be mounted on both sides if desired. Alternatively other wheel drive means, such as a drive shaft or a direct gear transmission assembly, could also be used without interfering with the operation of the bicycle pedal extension apparatus according to the present invention. For purposes of clarity and explanation, synchronizing gear means 40 has been shown in FIG. 2 in a horizontally disposed position. In the preferred embodiment fixed idler shafts 50 and 52 are oriented parallel to one another at an angular position about axle 12 which allows sufficient clearance for free gear rotation while permitting rigid attachment to the bicycle frame.

Each hub 16 and 18 is shown supported for rotation about axle 12 as by right outward hub bearing 66 and right inward hub bearing 68 with corresponding left outward hub bearing 70 and left inward hub bearing 72. In the preferred embodiment antifriction ball or roller bearings are used. The bearing races can be formed directly into the rotating hubs or can be pressed into a hollow portion at either end of the hubs. These bearings are preferably spaced apart in each hub to the maximum extent possible for maximizing the stability of the hubs.

The right extension cylinder 20 and the left extension cylinder 21 are also shown in cross section and are constructed to provide adequate support for the pedals and pedal extension arms when they are in the maximum extended positions and also to permit complete contraction in the minimum length position. This can for example be accomplished with a smooth cylinder interior wall 74 into which a sliding portion 76 of extending pedal ar 22 is inserted. Sliding portion 76 is constructed for reduced friction sliding bearing support along cylinder interior wall 74. Preferably a distal support guide 78 is constructed for smooth sliding engagement with the surface of extending arm 22. Guide 78 can be smaller than portion 76 to prevent removal of extending arm 22. However, as the crank rod 32 is connected with the rigid arm 30 to establish the maximum extension distance, the extending arm will remain inserted throughout the entire rotation cycle. It is desirable and advantageous to provide guide 78 with a dust seal to exclude dirt and other contaminants so there is smooth sliding in all weather conditions.

While the invention has been described in connection with a preferred embodiment, it is not intended to limit the scope of the invention to the particular form set forth, but, on the contrary, it is intended to cover such alternatives, modifications, and equivalants as may be included within the spirit and scope of the invention as defined in the appended claims.

What I claim is:

1. A pedal extension mechanism comprising;
   a) a rigid axle affixed perpendicular to a frame having rigid arms positioned substantially at right angles on both ends of said rigid axle;
   b) crank rod means rotatably connected at a first end to each of said rigid arms perpendicularly offset from said axle and having second ends with bearing means therein;
   c) two rotating pedal hub means operatively affixed and rotatable around said rigid axle interconnected by an idler gear assembly for synchronizing said hubs during rotation;
   d) a pedal extension cylinder affixed at right angles to each of said rotating pedal hub means;
   e) extending arms having pedals thereon which extending arms are slideably inserted into said extension cylinders interconnected with said bearing means of said crank rod for extending said extending arms along said extension cylinders on each respective down stroke and for contracting said extending arms into said extension cylinders on each upstroke; and
   f) means affixed to at least one of said hubs for capturing power input into said pedals.

2. The pedal extension mechanism as in claim 1 wherein each said extending arm is partially housed inside each said extension cylinder on said rotating pedal hub means such that said extending arm is allowed to travel the length of said extension cylinder.

* * * * *